US008171259B2

(12) United States Patent
Hanai et al.

(10) Patent No.: US 8,171,259 B2
(45) Date of Patent: May 1, 2012

(54) MULTI-CLUSTER DYNAMIC RECONFIGURABLE CIRCUIT FOR CONTEXT VALID PROCESSING OF DATA BY CLEARING RECEIVED DATA WITH ADDED CONTEXT CHANGE INDICATIVE SIGNAL

(75) Inventors: Takashi Hanai, Kawasaki (JP); Shinichi Sutou, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 537 days.

(21) Appl. No.: 12/394,863

(22) Filed: Feb. 27, 2009

(65) Prior Publication Data

US 2009/0319762 A1    Dec. 24, 2009

(30) Foreign Application Priority Data

Jun. 19, 2008   (JP) .................................. 2008-160430

(51) Int. Cl.
*G06F 15/16* (2006.01)
(52) U.S. Cl. ............... 712/15; 712/28; 712/30; 712/225
(58) Field of Classification Search ........................ None
See application file for complete search history.

(56) References Cited

U.S. PATENT DOCUMENTS

| | | | |
|---|---|---|---|
| 6,528,810 B1* | 3/2003 | Toda | 250/586 |
| 2005/0219605 A1* | 10/2005 | Sato | 358/1.14 |
| 2011/0072298 A1* | 3/2011 | Kuroda | 714/2 |

FOREIGN PATENT DOCUMENTS

JP    2006-018514 A    1/2006

\* cited by examiner

*Primary Examiner* — Kenneth Kim
(74) *Attorney, Agent, or Firm* — Fujitsu Patent Center

(57) ABSTRACT

A dynamic reconfigurable circuit includes multiple clusters each including a group of reconfigurable processing elements. The dynamic reconfigurable circuit is capable of dynamically changing a configuration of the clusters according to a context including a description of processing of the processing elements and of connection between the processing elements. A first cluster among the clusters includes a signal generating circuit that when an instruction to change the context is received, generates a report signal indicative of the instruction to change the context; a signal adding circuit that adds the report signal generated by the signal generating circuit to output data that is to be transmitted from the first cluster to a second cluster; and a data clearing circuit that, when output data to which a report signal generated by the second cluster is added is received, performs a clearing process of clearing the output data received.

8 Claims, 20 Drawing Sheets

FIG.1
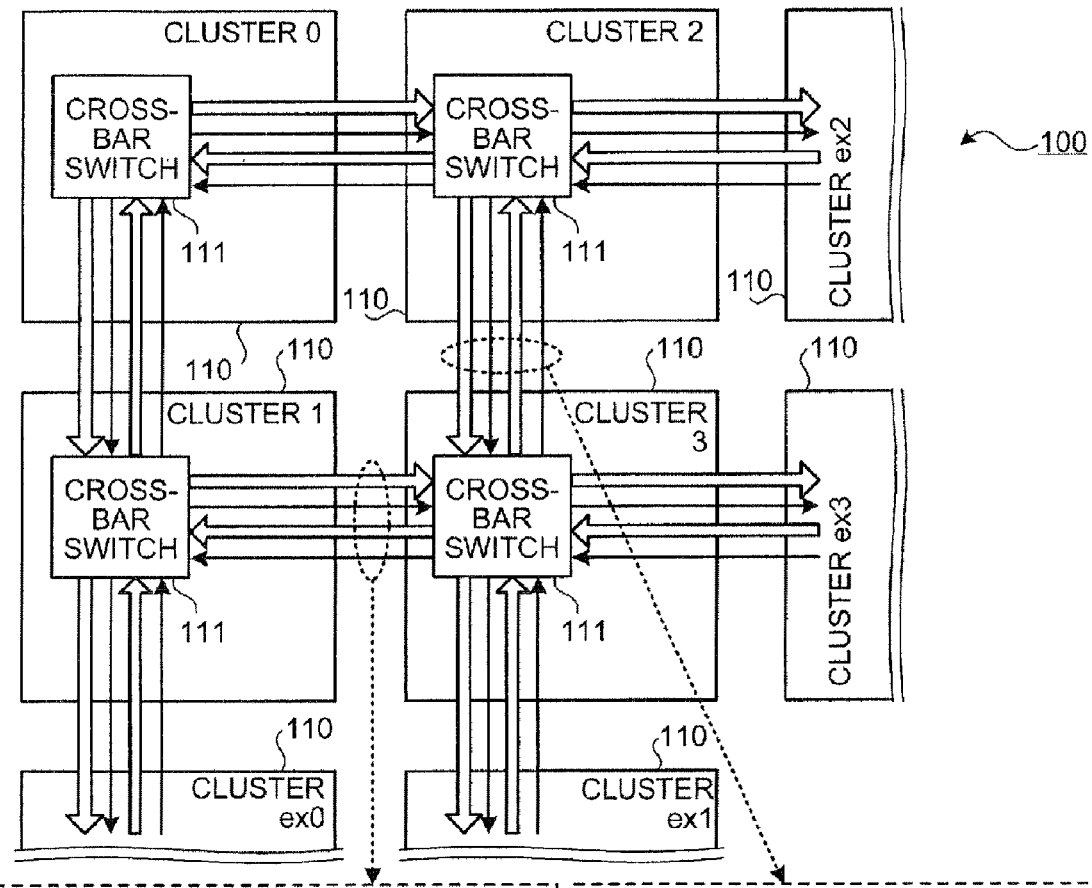
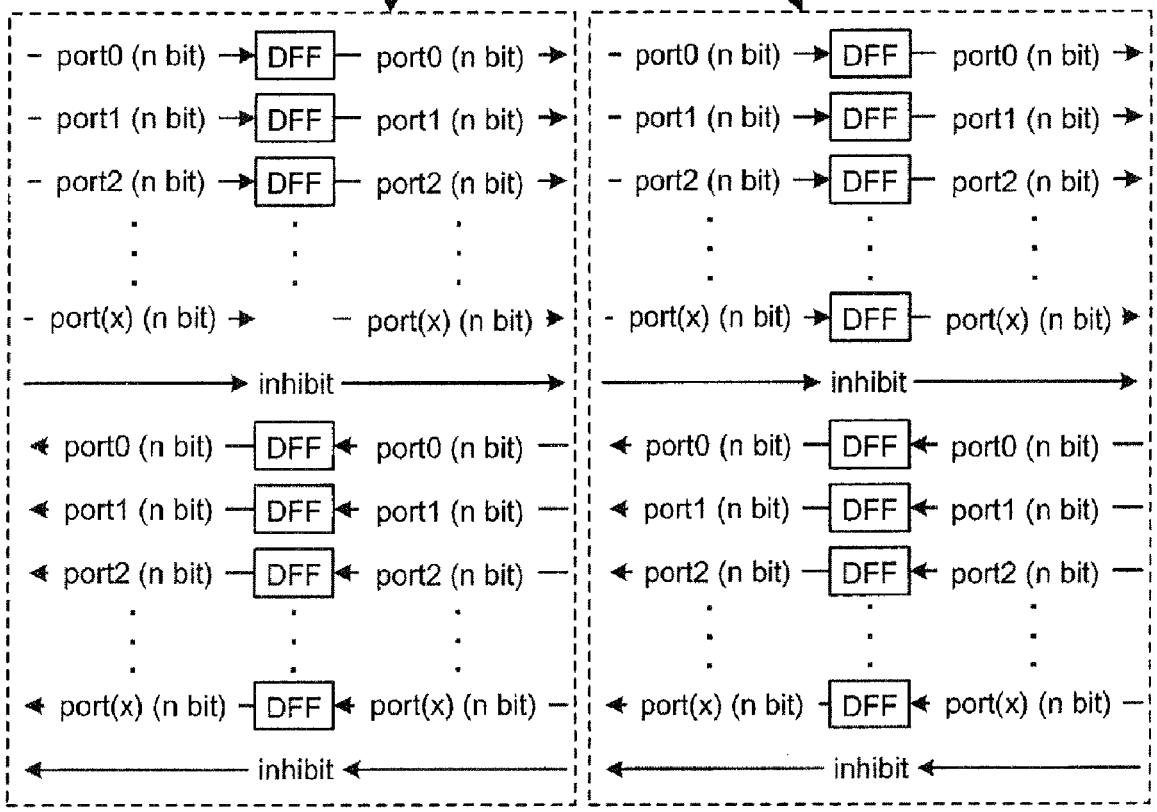

FIG.13

```
/*CONTEXT - 0*/
for( i =0;  i< 64; i++ ) {
    func - 0(A[i]);
}
for( j =0;   j< 32; j++ ) {
    func - 1(B[j]);
}

/*CONTEXT - 1*/
for( i =0;  i< 64; i++ ) {
    func - 0(A[i]);
    func - 1(A[i],C[i]);
}
```

1301 — /*CONTEXT - 0*/ block
1302 — /*CONTEXT - 1*/ block
1300

MULTI-CLUSTER DYNAMIC RECONFIGURABLE CIRCUIT FOR CONTEXT VALID PROCESSING OF DATA BY CLEARING RECEIVED DATA WITH ADDED CONTEXT CHANGE INDICATIVE SIGNAL

CROSS REFERENCE TO RELATED APPLICATIONS

This application is based upon and claims the benefit of priority of the prior Japanese Patent Application No. 2008-160430, filed on Jun. 19, 2008, the entire contents of which are incorporated herein by reference.

FIELD

The embodiment discussed herein is related to a dynamic reconfigurable circuit and to a data transmission control method of a dynamic reconfigurable circuit.

BACKGROUND

Conventionally, dynamic reconfigurable circuits (hereinafter, reconfigurable circuits) have a function of changing the contents of a command to a processing element (PE) in the reconfigurable circuit and connection between PEs during operation. Generally, information indicative of the contents of a command to a PE in the reconfigurable circuit and of connection between PEs is referred to as a context. Reading in a new context to change configuration is referred to as context switch.

The reconfigurable circuit changes a context to enable common use of PEs divided along a temporal axis, thereby enabling reduction of the hardware size of the reconfigurable circuit as a whole. The reconfigurable circuit may include plural clusters (see, e.g., Japanese Laid-Open Patent Application Publication No. 2006-18514). Such a cluster-type reconfigurable circuit can control context switch according to cluster.

FIG. 17 is a circuit diagram of an internal configuration of a conventional cluster. A cluster 110 includes a sequencer 310, a configuration memory 320, a PE array 330, and a crossbar switch 111. The sequencer 310, a state machine, controls the switching of context stored on the configuration memory 320. The PE array 330 changes the arithmetic processing contents or connections of PEs according to configuration data read out from the configuration memory 320 under the control of the sequencer 310.

Typically, in the installation of an application program to a reconfigurable circuit, a source code written in C language and compiled by a compiler for the reconfigurable circuit is used for the application program. Here, among processes written in C language, a loop control process is particularly time consuming. The reconfigurable circuit, however, has a configuration that reduces the processing time for the loop control through pipeline arithmetic processing of the loop control. Specifically, the reconfigurable circuit includes a counter and output from the counter serves as a starting point from which the arithmetic processing including loop control can be controlled.

The clusters 110, as depicted FIG. 17, are interconnected via respective crossbar switches 111 in a matrix arrangement. FIG. 18 is a schematic of an example of data transfer between conventional clusters. Connections between the clusters 110 will be described with reference to FIG. 18. In a reconfigurable circuit 100, the clusters 110 are interconnected via the crossbar switches 111 in a matrix arrangement. In this manner, by using the crossbar switches 111, the number of clusters is adjusted to determine the number of arithmetic processors (PE) incorporated in the reconfigurable circuit 100 enabling customization. The clusters 110 can transfer data to each other via the crossbar switches 111. In this configuration, a D flip-flop (DFF), which is not depicted, is disposed on a line interconnecting clusters. Disposing the DFF prevents such a situation where a timing restriction on data transfer between clusters 110 cannot be satisfied due to LSI operation speed.

In the cluster-type reconfigurable circuit 100, therefore, the number of clusters 110 and the number and bit width of ports on a line between clusters 110 can be changed freely, depending on the application program installed in the reconfigurable circuit 100 and the circuit area of the LSI. In the example depicted in FIG. 18, the number of clusters is four (clusters 0, 1, 2, and 3). When the number of PEs is to be increased, additional clusters, such as clusters ex0, ex1, ex2, and ex3, are arranged horizontally and vertically with respect to the orientation of FIG. 18.

The number and bit width of ports on a line between clusters 110 depend on the architecture of arithmetic processors in the clusters 110. Generally, any one of an 8-bit processor, 16-bit processor, and 32-bit processor is adopted. By increasing the number of ports, the types of data that can be transferred between clusters 110 can be increased.

The conventional cluster-type reconfigurable circuit 100, however, may have trouble in data transmission between the clusters 110 when carrying out processing across context switching (e.g., a series of processes including a change in context from a context A to a context B).

A context can be changed without a standby-cycle when the sequencer 310 in the cluster 110 is able to read a context transition destination in advance. When data transmission is performed between different clusters 110, however, a cluster 110 as a data transmission origin cannot grasp the state of another cluster 110 as a data transmission destination. As a result, the data transmission origin cluster 110 sends unnecessary data to the data transmission destination cluster 110 because of the context switch, which may lead to the occurrence of a malfunction.

In an example in which a group of clusters 110 are interconnected in matrix arrangement as depicted in FIG. 18, two types of data A and B are transferred from a cluster 0 to clusters 2 and 3. FIG. 19 is a schematic of a context switch sequence at each cluster.

At each cluster 110 (cluster 0, 1, 2, and 3) depicted in FIG. 18, context switch from a context 0 to a context 1 is performed at a given time (time n) (see FIG. 19) under the control of the internal sequencer 310 (see FIG. 17). "context numeral-numeral" written in each cluster depicted in FIG. 19 means "context [context number]-[cluster number]". In context switching, transition to the next context can be made without a stand-by cycle.

As depicted in FIG. 19, when data transfer is performed between clusters 110 across context switching, the reconfigurable circuit 110 may malfunction because of the DFF disposed on the line between the clusters 110. FIG. 20 is a timing chart of inter-cluster data transfer operation. As depicted in the timing chart of FIG. 20, while executing contexts 1-2 and 1-3, clusters 2 and 3 receive data that the cluster 0 outputs according to a context 0-0 (portion marked with *). The data received is data that has been held in the DFF between the clusters 110 during cluster switch.

As depicted in FIG. 20, among data output from the cluster 0, data A-0 to A-5 and B-0 to B-5 are generated by a process based on the context 0, while data A-6 to A-10 and B-6 to B-10 are generated by a process based on the context 1. Here, if the clusters 2 and 3 continue to use output data that is generated based on the context 0 preceding the current context by one context as input data (i.e., group of data marked with * in FIG. 20), the clusters 2 and 3 receiving the data having been held in the DFF causes no problem.

However, when the output data based on the context 0 is not used as input data that is to be used based on the currently set context 1, using the data based on the context 0 preceding the current context by one context and having been held in the DFF between the clusters 110, may result in output of different calculation values or the occurrence of malfunction. To remedy such a situation, a cycle of intentional flow of invalid data must be added during context switch, resulting in the occurrence of unnecessary waiting during context switch, thus leading to a problem of the deterioration of performance of the reconfigurable circuit.

SUMMARY

According to an aspect of an embodiment, a dynamic reconfigurable circuit includes multiple clusters each including a group of reconfigurable processing elements. The dynamic reconfigurable circuit is capable of dynamically changing a configuration of the clusters according to a context including a description of processing of the processing elements and of connection between the processing elements. A first cluster among the clusters includes a signal generating circuit that when an instruction to change the context is received, generates a report signal indicative of the instruction to change the context; a signal adding circuit that adds the report signal generated by the signal generating circuit to output data that is to be transmitted from the first cluster to a second cluster; and a data clearing circuit that, when output data to which a report signal generated by the second cluster is added is received, performs a clearing process of clearing the output data received.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a schematic of connections of clusters in a reconfigurable circuit according to an embodiment;

FIG. 13 is a schematic of an example of an application program installed in the reconfigurable circuit;

DESCRIPTION OF EMBODIMENT(S)

Figure 2:
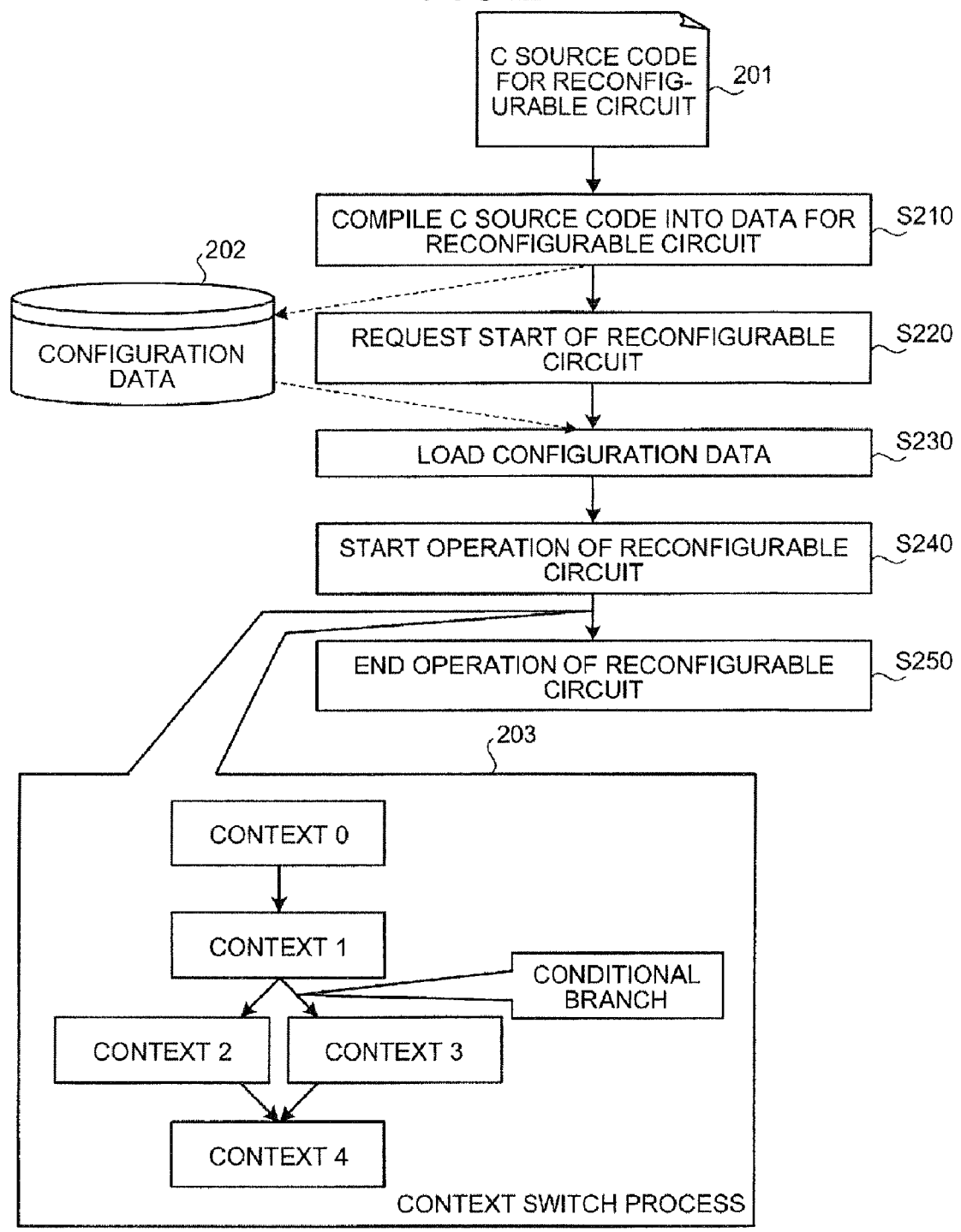
FIG. 2 is a schematic of an application procedure of the reconfigurable circuit.

Preferred embodiments of the present invention will be explained with reference to the accompanying drawings. According to the embodiments, optimum data flow is achieved between clusters by adding a report signal (i.e., inhibit signal to be described later) indicative of data during context switch to data transmitted between clusters.

FIG. 1 is a schematic of connections of clusters in a reconfigurable circuit according to an embodiment. As depicted in FIG. 1, a reconfigurable circuit 100 includes plural clusters 110 connected via crossbar switches 111 in a matrix arrangement.

A line interconnecting clusters 110 is provided with ports (e.g., port 0 to port (x)) for transmitting data generated by the clusters 110 as output data to a specific cluster. In the embodiment, the line also includes a dedicated port (inhibit) for transmitting an inhibit signal, in addition to the ordinary ports. In FIG. 1, the dedicated port (inhibit) for one line is exemplarily depicted for simplification, though the number of dedicated ports provided is equivalent to the number of data output ports (the ports 1 to (x)).

In the embodiment, when output data is transmitted from a cluster 110 (e.g., cluster 0) to another cluster 110 (e.g., clusters 2 and 3), an inhibit signal is output from the dedicated port concurrently. When output data of a cluster 110 is addressed to another cluster 110, the crossbar switch 111 of the other cluster 110 receives the output data and when the output data transmitted is not addressed the other cluster 110, the other cluster 110 forwards the output data to a cluster 110 adjacent to the cluster 110 having transmitted the output data. In other words, when determined to be the cluster to receive output data, the cluster receives the output data and when not determined to be an address cluster, the cluster causes the output data to travel through to a transmission destination cluster. When receiving output data, therefore, each cluster is able to make a determination on the context switch status of a transmission destination cluster 110 according to whether an inhibit signal is added to the output data.

A general configuration of the reconfigurable circuit 100 of the embodiment is described with reference to FIG. 1. The reconfigurable circuit (a dynamic reconfigurable circuit) 100 includes plural clusters 110 each including a group of PEs for which a PE command and inter-PE connection can be changed dynamically according to a context. The reconfigurable circuit 100 works together with a high-order program to execute a PE command and inter-PE connection set in a specified context to realize operation desired by a user.

When the reconfigurable circuit 100 executes a program prepared by a user, the program is compiled according to the configuration of the reconfigurable circuit 100. A practical application procedure of the reconfigurable circuit 100 is described. An example is assumed where a user prepares a program written in C language to cause the reconfigurable circuit 100 to execute the program. A program written in a higher language other than C language may also be used. In such a case, a compiler corresponding to the higher language is prepared.

FIG. 2 is a schematic of an application procedure of the reconfigurable circuit. As depicted in FIG. 2, a C source code 201 for a reconfigurable circuit is prepared. The C source code 201 for the reconfigurable circuit is a source code that is written in C language prepared by the user of the reconfigurable circuit 100.

In use of the reconfigurable circuit 100, the C source code 201 for the reconfigurable circuit is translated first by a compiler for a reconfigurable circuit (step S210) to generate configuration data 202. The compiler is a compiler for the reconfigurable circuit 100 to be used, and generates the configuration data 202 corresponding to the hardware configuration of the reconfigurable circuit 100.

Following the end of compiling by the compiler for the reconfigurable circuit, a startup request for starting up the reconfigurable circuit 100 is made (step S220). After the startup request is made, the configuration data 202 generated at step S210 is loaded (step S230), and the reconfigurable circuit 100 starts operating (step S240).

The contents of the process at step S240 is described in detail. When the clusters 110 start up as a result of the startup of the reconfigurable circuit 100, the configuration data 202 is written to a configuration memory in each cluster 110. A sequencer in each cluster 110 then performs a context switch process (203) according to the configuration data 202 written to the configuration memory. When the context switch according to the configuration data 202 is finished, a series of operations by the reconfigurable circuit ends (step S250).

In this manner, according to the reconfigurable circuit 100 of the embodiment, different contexts are set for different programs to be executed, and the contexts are changed dynamically according to the processing flow.

Figure 3:
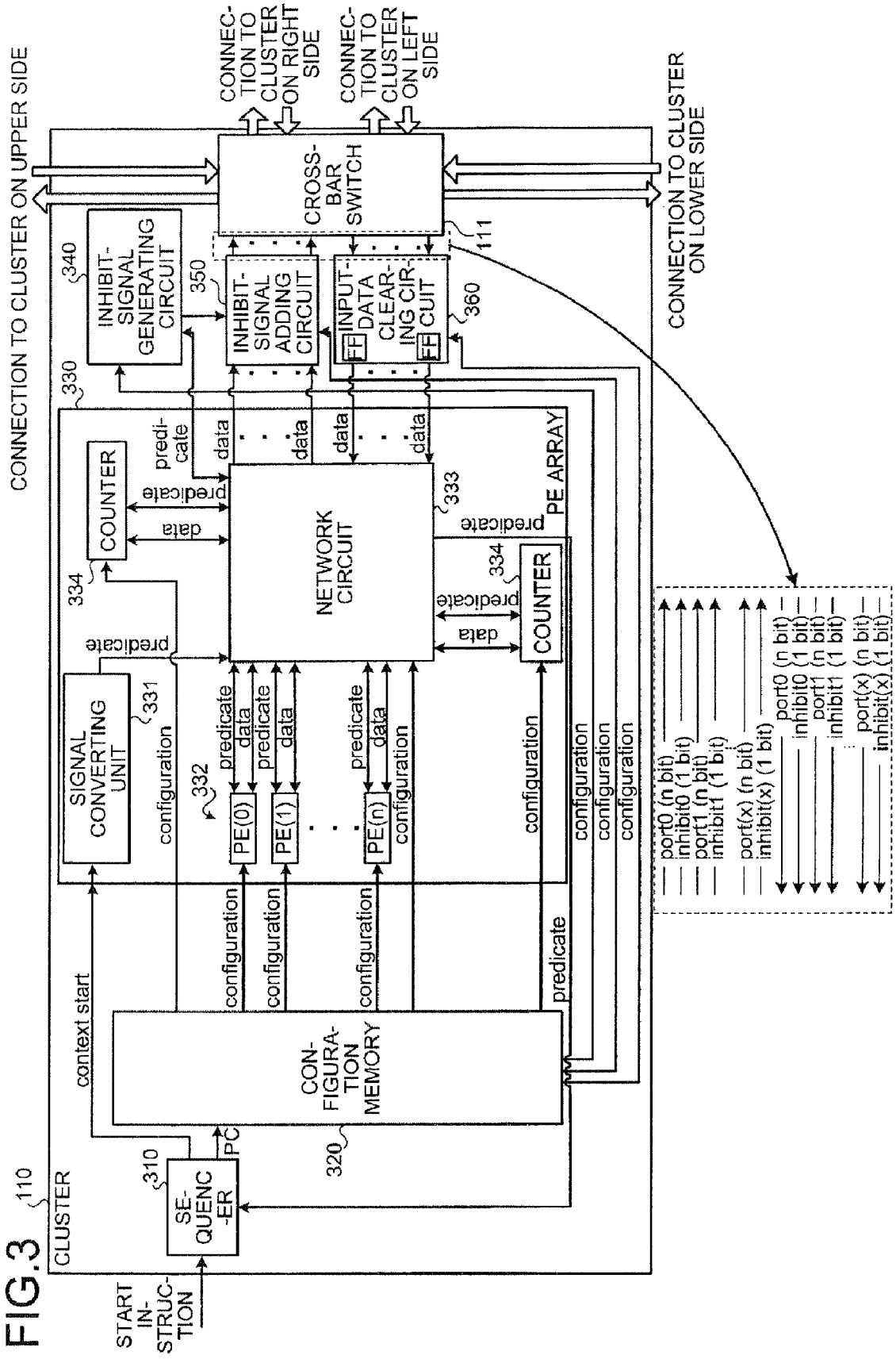
FIG. 3 is a circuit diagram of a configuration of a cluster according to the embodiment.

FIG. 3 is a circuit diagram of a configuration of the cluster according to this embodiment. As depicted in FIG. 3, the cluster 110 includes arithmetic processing functional units including a sequencer 310, a configuration memory 320 and a PE array 330, and data transferring functional units including a crossbar switch 111, an inhibit-signal generating circuit 340, an inhibit-signal adding circuit 350 and an input-data clearing circuit 360.

The operation of the cluster 100 related to arithmetic processing is started by a trigger that is a context start instruction (signal) from a high-order program. The cluster 110 has the crossbar switch 111, as depicted in FIG. 1, and transmits output data to and receives input data from another cluster 110 via the crossbar switch 111.

When the sequencer 310 receives a start instruction (signal) from a high-order program, the sequencer 310 outputs a program counter (PC) value to the configuration memory 320 and further outputs a context start signal to the PE array 330 to perform a context switch instruction and change the connection and command setting of PEs in the cluster. The PE array 330 having received the context start signal transmits a predicate signal to the sequencer 310 when processing based on a set context is finished. The predicate signal is a signal for executing control in the PE array 330 and giving a context switch instruction to the sequencer 310. Upon receiving the predicate signal, the sequencer 310 outputs the PC value and the context start signal to the configuration memory 320 and the PE array 330, respectively, to change the next context.

The configuration memory 320 stores therein the configuration data 202 generated at step S210 depicted in FIG. 2. The configuration data 202 is made up of contexts to be executed by the reconfigurable circuit. When input of a PC value from the sequencer 310 is received, the configuration memory 320 outputs the configuration data 202 of a context corresponding to the PC value as a configuration signal to each functional unit in the PE array 330. The configuration data 202 includes a signal for controlling the operation of the inhibit-signal generating circuit 340, the inhibit-signal adding circuit 350, and the input-data clearing circuit 360, which are data transferring functional units of the cluster. Therefore, the configuration memory 320 further outputs the configuration data as a configuration signal to each of the functional units 340 to 360.

Because a context is generated by compiling a program written by the user in C language, the number of contexts varies depending on the written contents of a program. During the compiling, a context based on the hardware configuration of the reconfigurable circuit is generated. Thus, in the embodiment, a context based on the configuration of the cluster 110 of the reconfigurable circuit is generated.

The PE array 330 is a functional unit that performs arithmetic processing according to the setting of a context. The PE array 330 includes a signal converter 331, a PE 332, a network circuit 333, and a counter 334. The signal converter 331 is a functional unit that converts a received context start signal into a predicate signal.

The PE 332 works as an operator, and performs arithmetic processing specified by an input configuration signal from the configuration memory 320. The network circuit 333 interconnects the signal converter 331, the PE 332, and the counter 334 in the PE array 330 according to an input configuration signal from the configuration memory 320. The counter 334 counts operations specified by an input configuration signal from the configuration memory 320.

Among the components of the PE array 330, the PE 332 and the counter 334 are arranged in plural. Within the PE array 330, a data signal is transmitted and received via the network circuit 333 to report a result of arithmetic processing by the PE 332 and a count value that is circuit output from the counter 334. Connection for the transmission and reception of data signals can be changed dynamically by the network circuit 333.

A predicate signal for executing control in the PE array 330 and giving a context switch instruction to the sequencer 310 is described. The predicate signal is a 2-bit control signal in the cluster that indicates a comparison result in the PE 332 and gives an instruction for the start and the end of a context. A connection destination for the predicate signal can also be changed dynamically by the network circuit 333.

The predicate signal is generated as a result of conversion of a context start instruction (signal) from the sequencer 310 into a 2-bit signal by the signal converter 331. The predicate signal generated by conversion is output to the PE 332 and to the counter 334 via the network circuit 333. Here, specifically, the predicate signal signifies the following:

2' b="11": true
2' b="10": false
2' b="01", "00": invalid, i.e., indicative of nothing Among the components of the cluster 110 depicted in FIG. 3, the crossbar switch 111, the inhibit-signal generating circuit 340, the inhibit-signal adding circuit 350, and the input-data clearing circuit 360 are functional units that appropriately perform data transfer between clusters 110. The crossbar switch 111 of the embodiment is configured to have a function of controlling data transfer.

Figure 4:
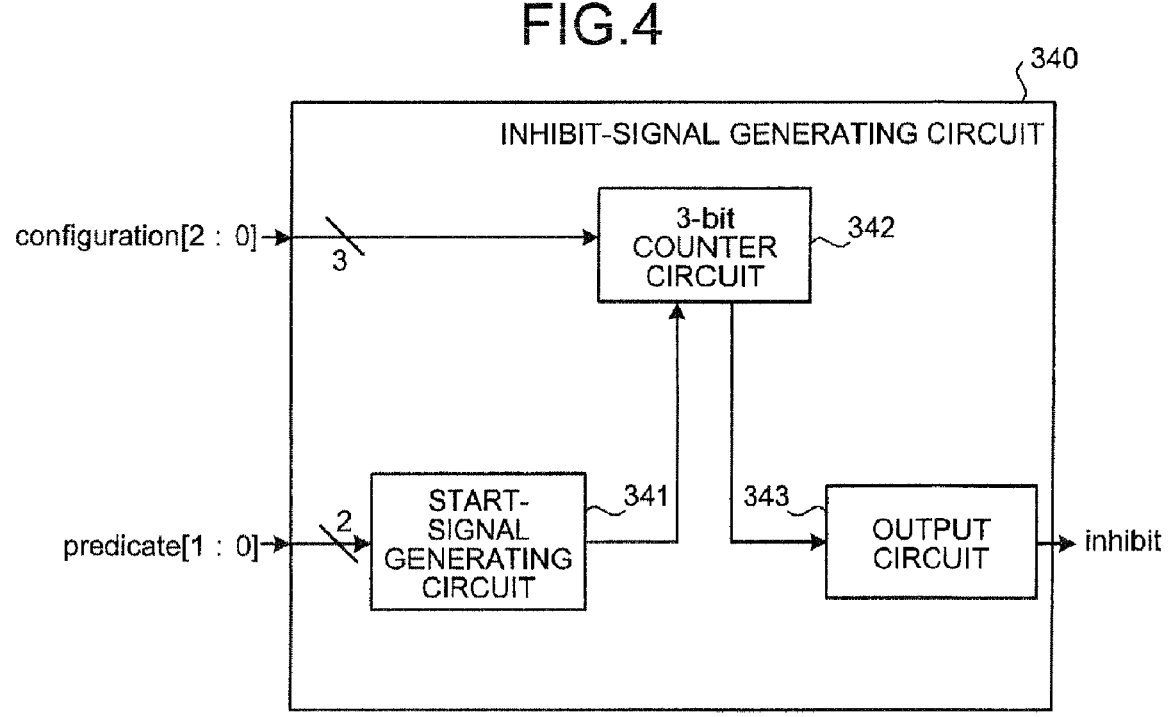
FIG. 4 is a circuit diagram of a configuration of an inhibit-signal generating circuit.

FIG. 4 is a circuit diagram of a configuration of the inhibit-signal generating circuit. The inhibit-signal generating circuit 340 receives input of a predicate signal from the PE array 330 and input of configuration data (configuration) from the configuration memory 320. The inhibit-signal generating circuit 340 has a function of generating an inhibit signal for a given period set in the configuration data using the predicate signal as a trigger for signal generation.

Specifically, the inhibit-signal generating circuit 340 includes a start-signal generating circuit 341, a 3-bit counter circuit 342, and an output circuit 343, as depicted in FIG. 4. In FIG. 4, a numeral on the input line of the predicate signal and a numeral on the input line of the configuration data represent the number of bits of the predicate signal and the number of bits of the configuration data, respectively.

The start-signal generating circuit 341 generates a start signal that causes the 3-bit counter circuit 342 to start counting at the input of the predicate signal having a value of "11" indicative of a true signal. The start signal generated by the start-signal generating circuit 341 is input to the 3-bit counter circuit 342.

Subsequently, the 3-bit counter circuit 342 counts the number of times the start signal is input from the start-signal generating circuit 341 for a given period set in the input configuration data. Having a 3-bit memory capacity as the name indicates, the 3-bit counter circuit 342 can be set to count for 1 to 8 cycles in counting for a period of a preset value+1. The 3-bit counter circuit 342 outputs a flag indicative of counting in progress to the output circuit 343.

While receiving input of the flag from the 3-bit counter circuit 342, the output circuit 343 continuously outputs an inhibit signal, which is output to the inhibit-signal adding circuit 350. Thus, a period during which the inhibit signal is continuously output from the output circuit 343 is equivalent to an assert period of the inhibit signal.

Figure 5:
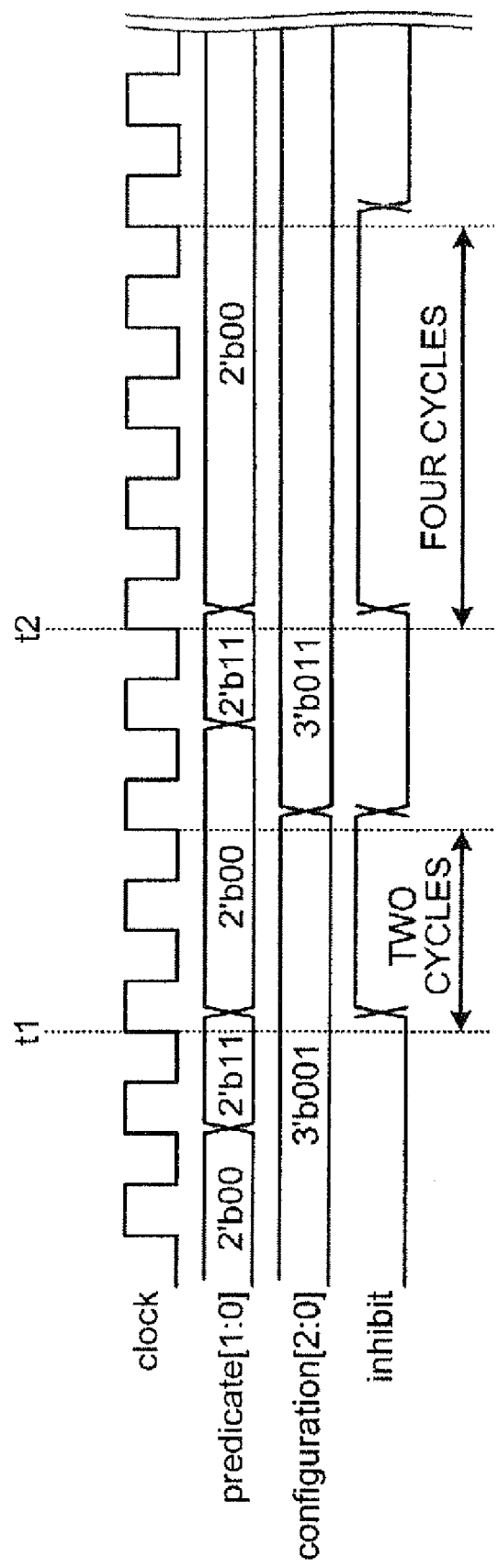
FIG. 5 is a timing chart of the operation of the inhibit-signal generating circuit.

FIG. 5 is a timing chart of the operation of the inhibit-signal generating circuit. A common clock signal (not depicted) is input to each cluster of the reconfigurable circuit 100. Processing by each functional unit, therefore, is performed based on a clock signal (clock) as depicted in FIG. 5.

In FIG. 5, "predicate" represents the value (2-bit value) of a predicate signal input to the start-signal generating circuit 341, "configuration" represents the value (3-bit value) of configuration data input to the 3-bit counter circuit 342, and "inhibit" represents a generation state of an inhibit signal. During a period in which "inhibit" remains high, the inhibit signal is continuously generated.

A period during which the inhibit signal is continuously generated thus represents an assert period of the inhibit signal. In the embodiment, a preset value (representing the configuration data value) plus one cycle is equivalent to an assert period of the inhibit signal. For example, in the timing chart depicted in FIG. 5, generation of the inhibit signal starts at a time t1 marked by the clock immediately after the predicate signal value changes to "11". At the time t1, the configuration data value is "001", which means the preset value is "1". Hence, the inhibit signal is continuously generated for two cycles that is the sum of the preset value "1" and one additional cycle.

When the predicate signal value subsequently changes to "11", the configuration data value changes to "011", which means the preset value is "3". As a result, the inhibit signal is continuously generated for four cycles from a time t2 immediately after the point at which the predicate signal value changes to "11".

In this manner, an assert period of an inhibit signal can be changed according to the setting of configuration data. An inhibit signal assert period that can be changed according to the setting of configuration data enables use of the inhibit-signal generating circuit 340 without altering the configuration thereof even when the number of stages of DFFs disposed on a connection line between clusters 110 is changed because of a timing restriction.

When unnecessary data other than data stored in the DFFs between clusters is present in output data, the output data can be cleared at an arbitrary cycle. As described with respect to FIG. 4, the 3-bit counter circuit 342 can count up to eight counts. If counting more than eight counts is desired according to the number of stages of DFFs, the 3-bit counter circuit 342 is expanded in counting capacity into a counter circuit capable of handling data greater than 3 bits.

Figure 6:
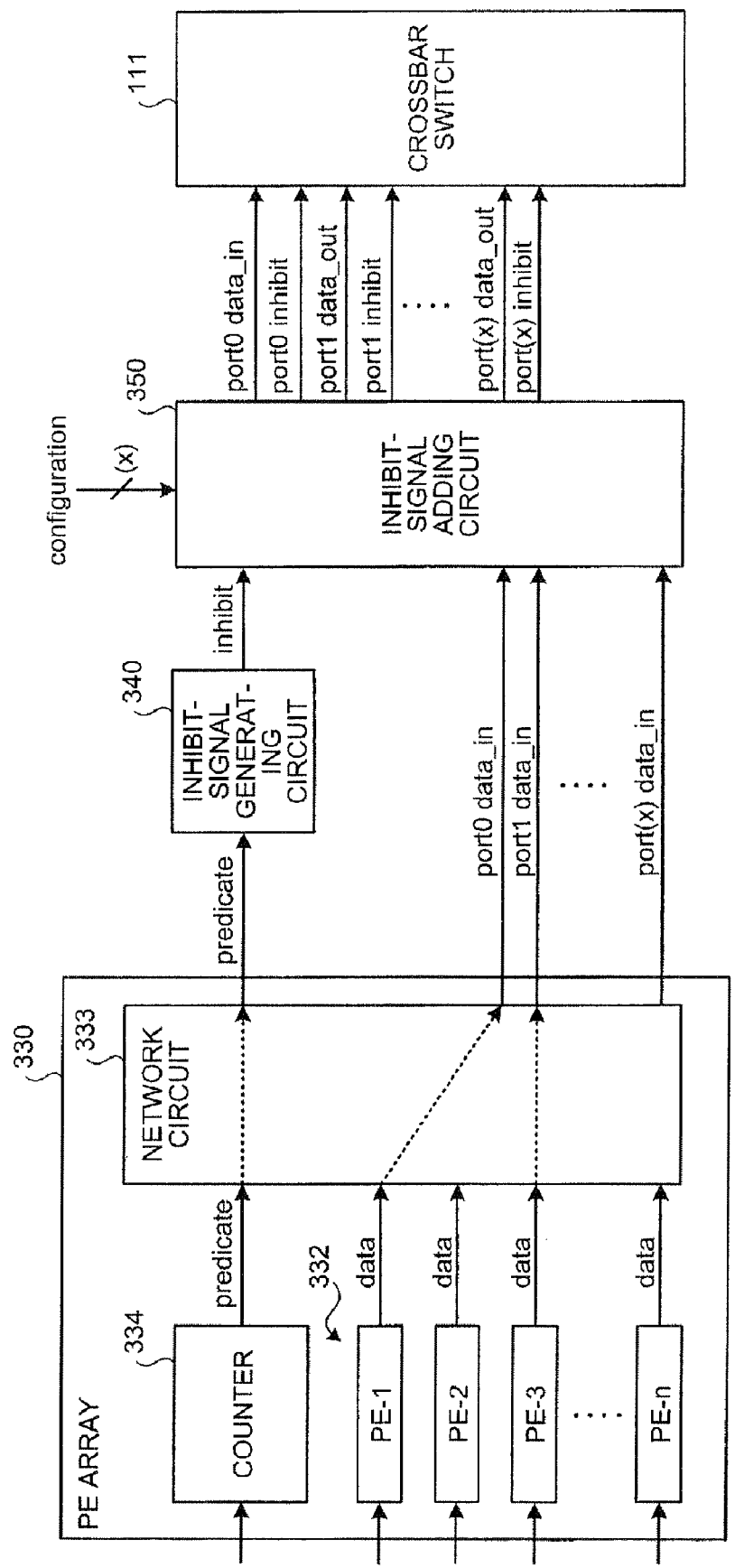
FIG. 6 is a block diagram of connections with an inhibit-signal adding circuit.

FIG. 6 is a block diagram of connections with the inhibit-signal adding circuit. When receiving input of an inhibit signal (inhibit) from the inhibit-signal generating circuit 340, the inhibit-signal adding circuit 350 performs a process of adding the input inhibit signal to a specified data port for output data. Here, whether to add the inhibit signal depends on the setting of configuration data. Thus, addition of the inhibit signal can be adjusted according to port. For this reason, the number of bits of the configuration data is equivalent to the number of ports for output from the cluster. In the embodiment, the cluster has (x) ports as depicted in FIG. 1; hence, the configuration data is assumed to be x-bit data.

Figure 7:
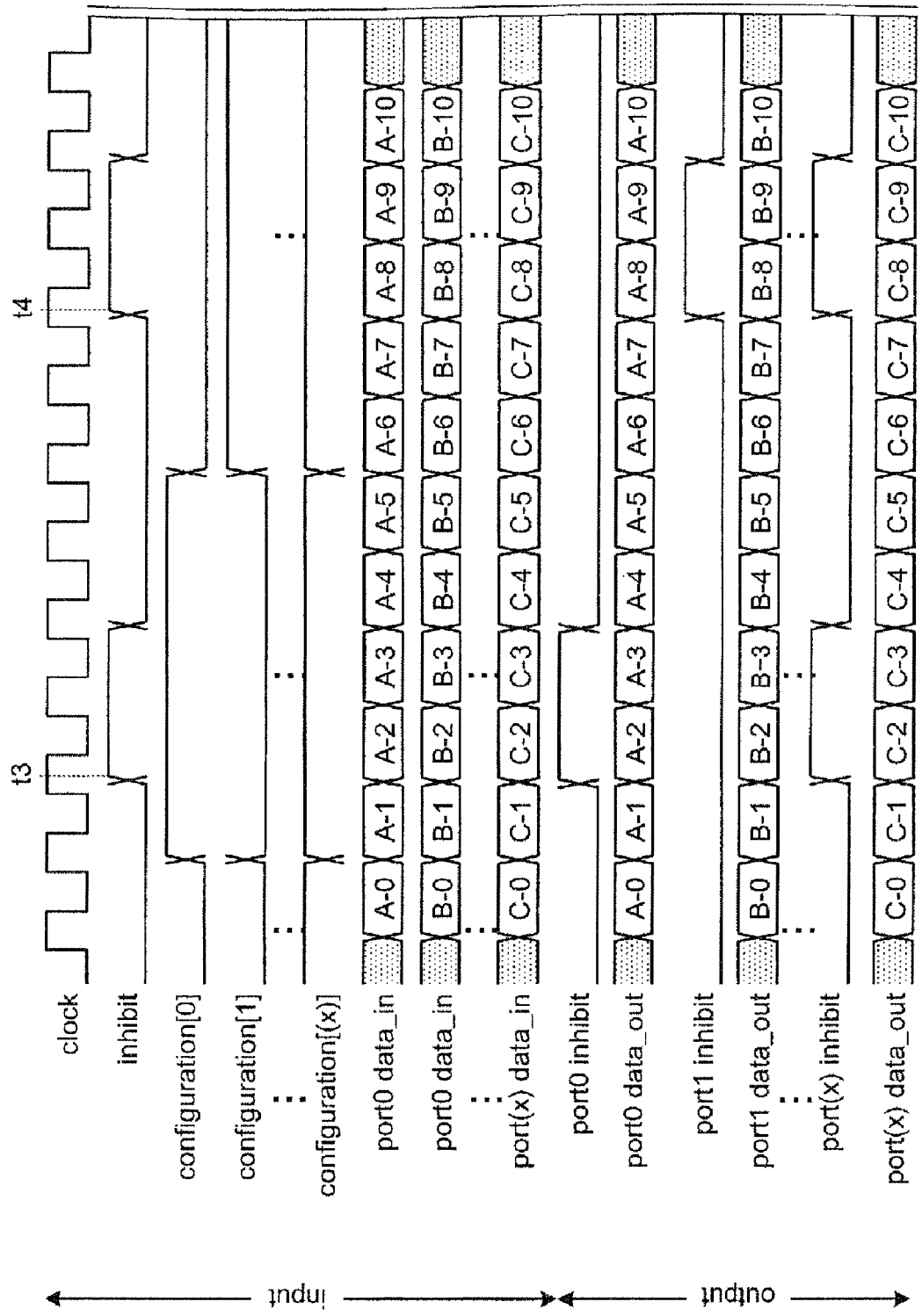
FIG. 7 is a timing chart of the operation of the inhibit-signal adding circuit.

FIG. 7 is a timing chart of the operation of the inhibit-signal adding circuit. FIG. 7 depicts an excerpt of the operation through peripheral connections of the inhibit-signal adding circuit 350 among the functional units described with respect to FIG. 3.

Configuration data (configuration) of (x)-bit data from the configuration memory 320 is input to the inhibit-signal adding circuit 350. When receiving input of an inhibit signal from the inhibit-signal generating circuit 340, the inhibit-signal adding circuit 350 determines whether to add the inhibit signal for each of the following ports, according to the setting of the configuration data input from the configuration memory 320. In this example, the inhibit signal is added when the setting of the configuration data is "1' b1"; the bit position corresponding to port number.

configuration [0]→port 0 data
configuration [1]→port 1 data . . .
configuration [(x)]→port (x) data As a result, output of the inhibit signal occurs according to port. Output data output from a port for which the inhibit signal is added is transmitted to another cluster 110 via the crossbar switch 111.

For example, in the timing chart depicted in FIG. 7, an inhibit signal is input from the inhibit-signal generating circuit 340 initially at a time t3. At this time, bits of configurations [0] and [(x)] are effective, which means addition of the inhibit signal. The inhibit signal is, therefore, added to data output from ports 0 and (x) among output data output from the crossbar switch 111, and is output together with the output data. An inhibit signal is input further at a time t4, at which bits of configurations [1] and [(x)] are effective; hence, the inhibit signal is added to data output from ports 1 and (x).

As described, the cluster 110 can add to output data, information indicative of context switch through the operation of the inhibit-signal generating circuit 340 and the inhibit-signal adding circuit 350. Based on the information, i.e., an inhibit signal, a cluster 110 to which output data is transmitted can determine whether context switch occurs at a cluster 110 transmitting the output data.

As described, the cluster 110 can add to output data, information indicative of context switch. The input-data clearing circuit 360 is a circuit that when output data with an inhibit signal added thereto is transmitted from another cluster 110, processes the output data properly.

Figure 8:
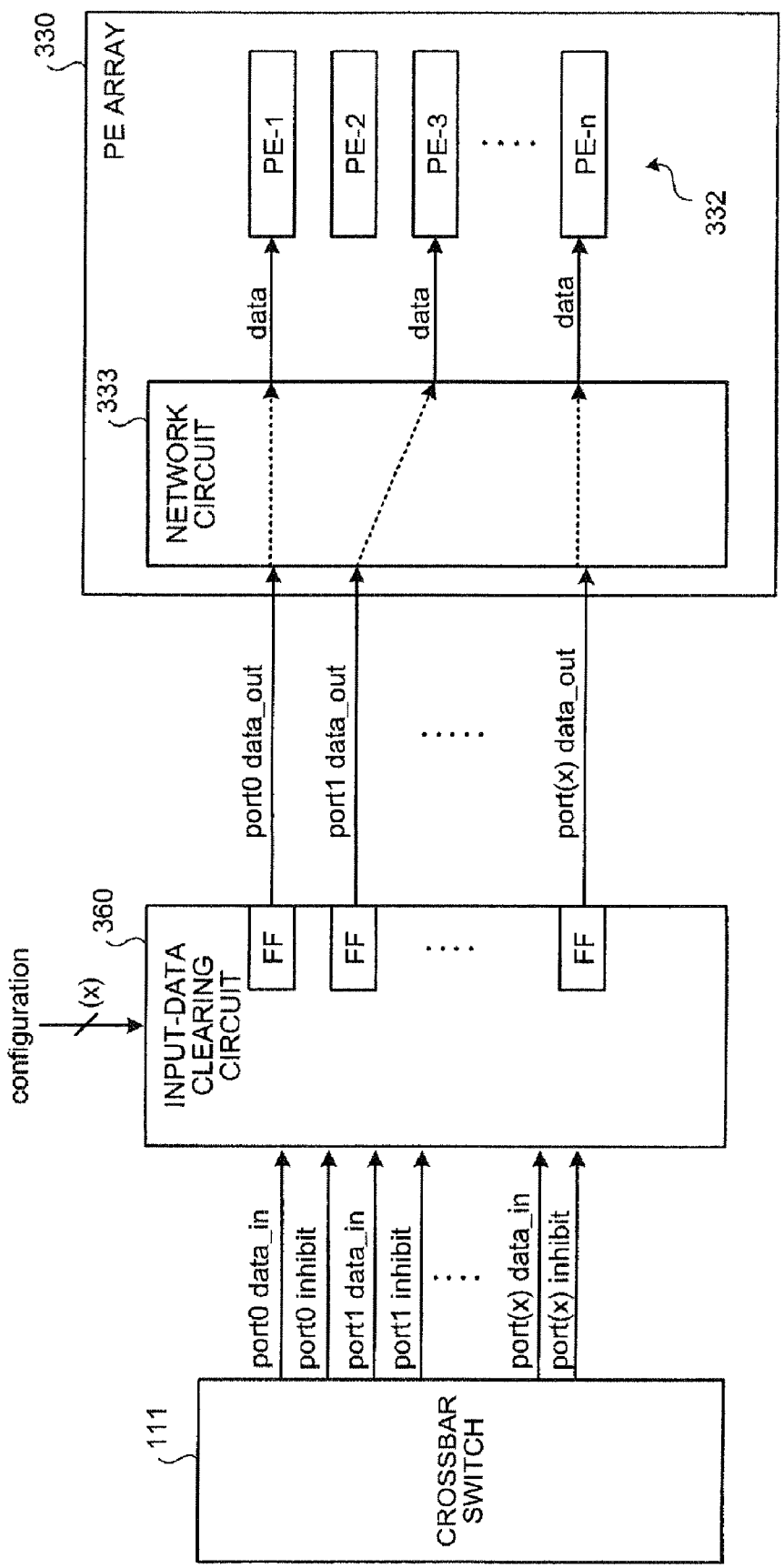
FIG. 8 is a block diagram of connections with an input-data clearing circuit.

FIG. 8 is a block diagram of connections with the input-data clearing circuit. The input-data clearing circuit 360, when the inhibit-signal adding circuit 350 adds, port by port, an inhibit signal to output data transmitted from another cluster 110, performs a clearing process (ALL-0) of clearing output data to be cleared. The clearing process is not performed indiscriminately on data with an inhibit signal added thereto. Based on the setting of configuration data, it can be determined port by port whether the clearing process is to be performed. The number of bits of the configuration data, therefore, is equivalent to the number of ports of the cluster 110. In the embodiment, the cluster has (x) ports as depicted in FIG. 1; hence, the configuration data is assumed to be x-bit data.

Figure 9:
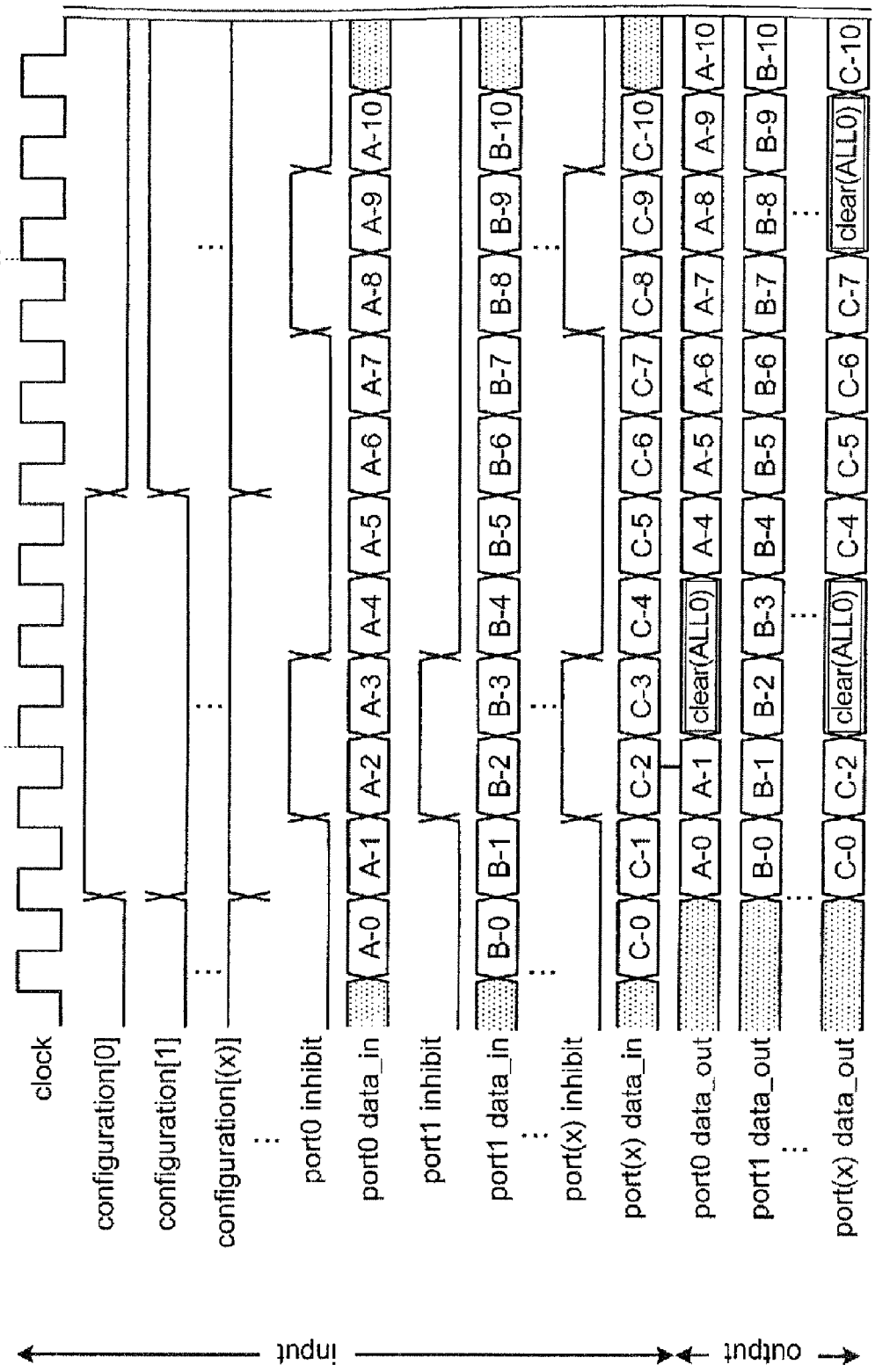
FIG. 9 is a timing chart of the operation of the input-data clearing circuit.

FIG. 9 is a timing chart of the operation of the input-data clearing circuit. FIG. 9 depicts an excerpt of the operation through peripheral connections of the input-data clearing circuit 360 among the functional units of the cluster 110 described with respect to FIG. 3.

Output data transmitted from another cluster 110 is input via the crossbar switch 111 to the input-data clearing circuit 360. Here, from a data port corresponding to the output data, an inhibit signal added at the cluster 110 generating the inhibit signal is output and is also input to the input-data clearing circuit 360. When the output data with the inhibit signal added thereto is input through each of the following ports based on (x)-bit configuration data, whether the corresponding output data is to be cleared is determined for each port. In this example, incoming output data (i.e., data input to this cluster 110) is cleared when the inhibit signal is added to the incoming output data and the setting of configuration data is "1'b1". When the inhibit signal is not added to incoming output data or when, although the inhibit signal is added, the setting of configuration data is "0", the incoming output data is directly output to the PE array 330. Here, the bit position in the configuration data corresponds to port number.

configuration [0]→port 0 data
configuration [1]→port 1 data . . .
configuration [(x)]→port (x) data For example, in the timing chart depicted in FIG. 9, an inhibit signal is added to input data from ports 0, 1, and (x) at a time t5. At this time, bits of configurations [0] and [(x)] are effective, which indicates an instruction for execution of the clearing process. The data from the ports 0 and (x) corresponding to the configurations [0] and [(x)] are, therefore, cleared (clear (ALL 0)). Subsequently, at time t6, the configurations [1] and [(x)] are effective. However, with respect to the port 1, as the input inhibit data is 0, the data clearing process is not executed. Meanwhile, with respect to the port (x), as the input inhibit data is 1, the data clearing process is executed.

In this manner, an inhibit signal is added to data to indicate that the data with the inhibit signal is data at the verge of context switch. Thus, when data is specified by configuration data as data to be cleared, using the period during which an inhibit signal is added to the data as a guide, the data is cleared, thereby preventing unintentional deletion of data.

Therefore, as depicted in FIG. 8, output data from the input-data clearing circuit 360 that is controlled by an inhibit signal passes directly through the network circuit 333 of the PE array 330 to be input to each PE 332. In this manner, the cluster 110 causes the input-data clearing circuit 360 to perform a determining process before input of output data transmitted from another cluster 110 to the PE array 330. Thus, the cluster 110 can select input data according to context switch.

In the embodiment, because data passes through one additional DFF stage when transferred to another cluster 110, the crossbar switch 111 has a function such that when input data is transferred to another cluster 110, if an inhibit signal has been added to the data, an inhibit signal is added to data at the subsequent cycle.

Figure 10:
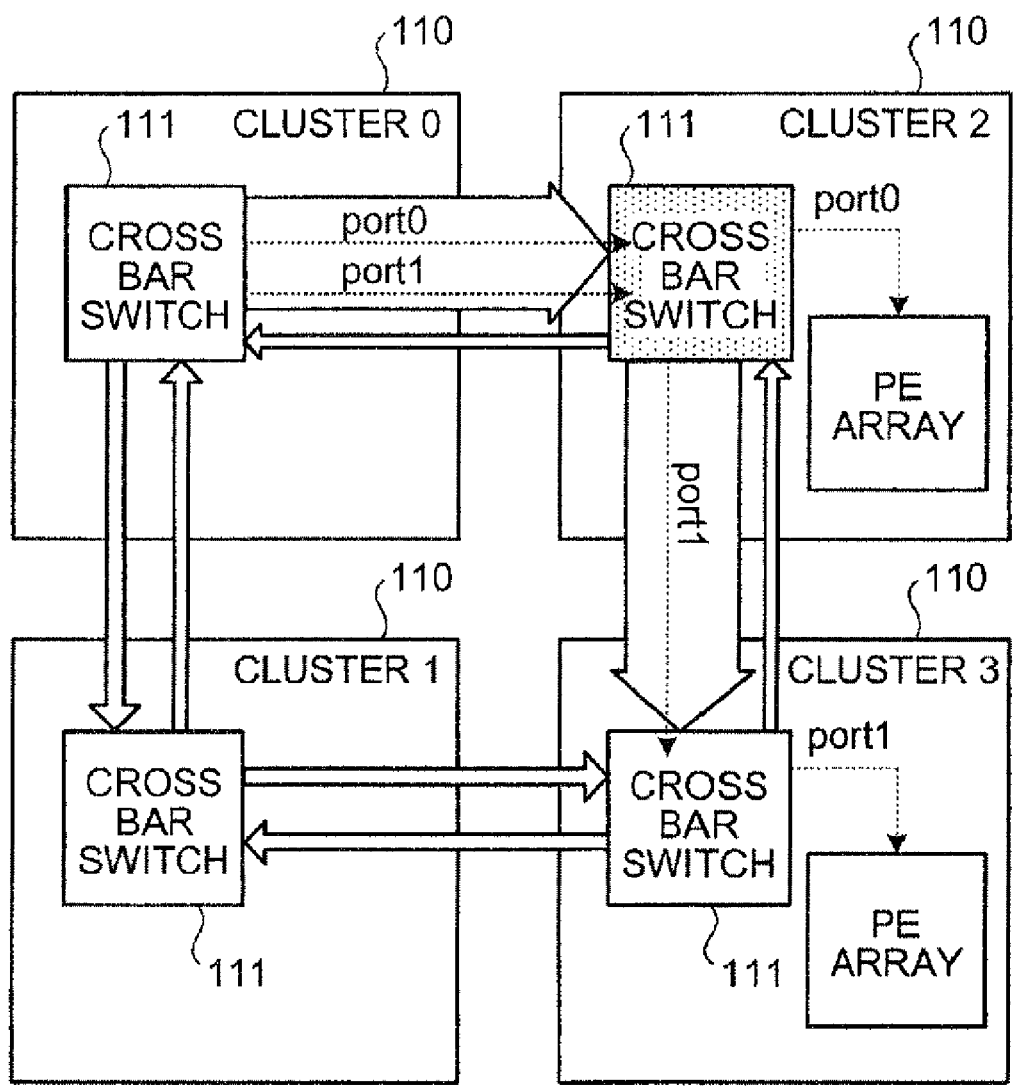
FIG. 10 is a schematic of an example of operation of a crossbar switch.

FIG. 10 is a schematic of an example of the operation of the crossbar switch. As depicted in FIG. 10, data generated by the cluster 0 is transmitted as output data through the cluster 2 to the cluster 3, using the port 1. An inhibit signal is added to the output data from the cluster 0.

Figure 11:
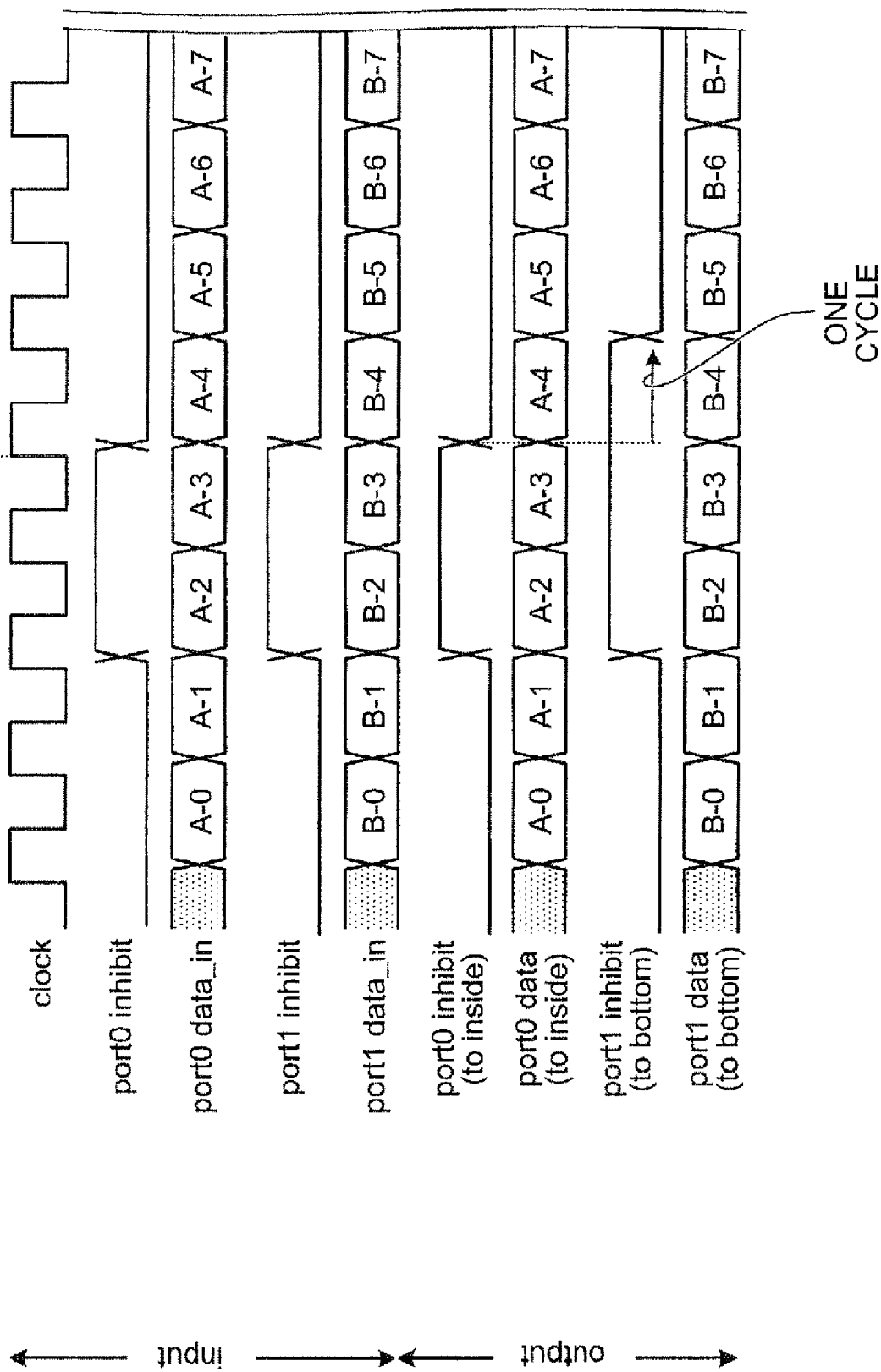
FIG. 11 is a timing chart of the operation of the crossbar switch of a cluster 2.

The output data from the cluster 0 passes through the cluster 2 to be transferred to the cluster 3. Here, the crossbar switch 111 in the cluster 2 newly adds a one-cycle inhibit signal to output data from the port 1. FIG. 11 is a timing chart of the operation of the crossbar switch of the cluster 2. As depicted in FIG. 11, at a time t7 immediately after the end of an inhibit signal adding period in the output data from the cluster 0, the crossbar switch 111 extends the inhibit signal adding period by one cycle before outputting the output data.

Figure 12:
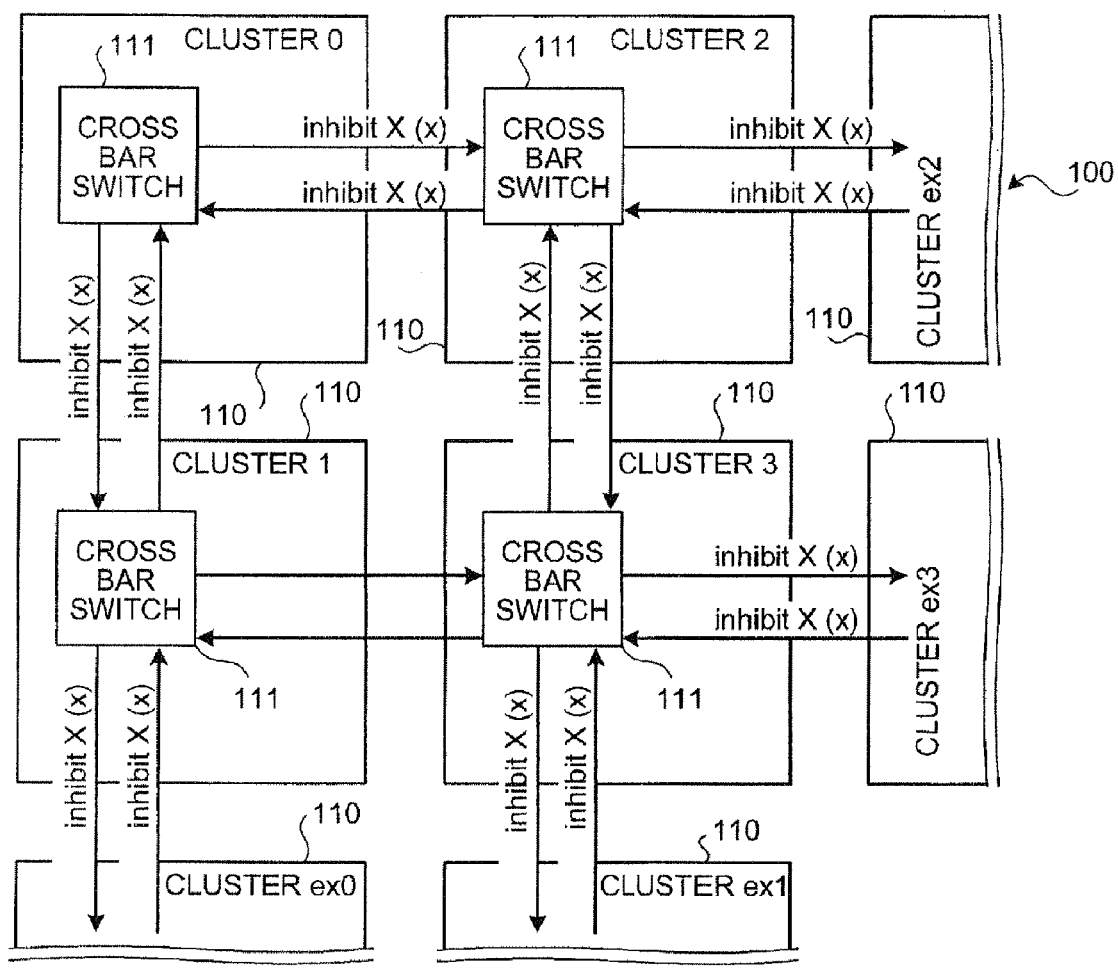
FIG. 12 is a schematic of connections between clusters concerning an inhibit signal.

FIG. 12 is a schematic of connections between clusters concerning an inhibit signal. Among connection lines between clusters 110, FIG. 12 depicts only the connection lines for the inhibit signal. Because the inhibit signal is paired with output data, the connection line for the inhibit signal passes through the crossbar switch 111 similar to a data transmission connection line as depicted in FIG. 10. Different from the connection line for transmitting output data, however, the connection line for transmitting the inhibit signal has no DFF thereon, as depicted in FIG. 1. Through application of the functions described with reference to FIGS. 10 and 11, the inhibit signal can be controlled so as not be added out of step with output data.

As described, in the reconfigurable circuit 100 of the embodiment, an inhibit signal is added to output data stored in a DFF between clusters 110 during context switch. This process enables a cluster 110 to determine whether incoming data is data output during context switch, i.e., hazard data.

A cluster 110 to which output data having an inhibit signal added thereto is transmitted, determines whether the inhibit signal is valid based on configuration data. When the inhibit signal is determined to be valid, data to be cleared is cleared. Setting concerning the determination of the validity/invalidity of the inhibit signal can be made port by port based on configuration data. In other words, the clearing operation can also be invalidated. Therefore, data having an inhibit signal added thereto is not cleared indiscriminately and may be used continuously as it is in a context after data switch.

Application of the clearing operation based on an inhibit signal enables the start of operation after the initialization of input to a cluster at the start of the second context and thereby eliminates a need of soft resetting at each cluster 110 and waiting time during context switch. Application of the process above enables the sharing of ports during context switch and thus suppresses an increase in wiring resources between clusters 110.

FIG. 13 is a schematic of an example of an application program installed in the reconfigurable circuit. Operations performed when an application program written by a source code 1300 depicted in FIG. 13 is executed are described.

Two contexts are written in the source code 1300. Specifically, a description 1301 is equivalent to a process of a context 0, and a description 1302 is equivalent to a process of a context 1. Array parameters A[ ], B[ ], and C[ ] written in the source code 1300 are expanded in a RAM, which is a PE in the cluster 110. func-0, func-1, and func-2 written in the source code 1300 represent arithmetic processing flows realized by combining plural PEs in the cluster 110.

Two for-statements written in the context-0 are not dependent on each other, and are, therefore, executed in parallel. The end of the final for-loop is waited for, and then the context 0 is switched to the context-1. The func-0 is executed in the context 0 and in the context 1 in succession.

Figure 14:
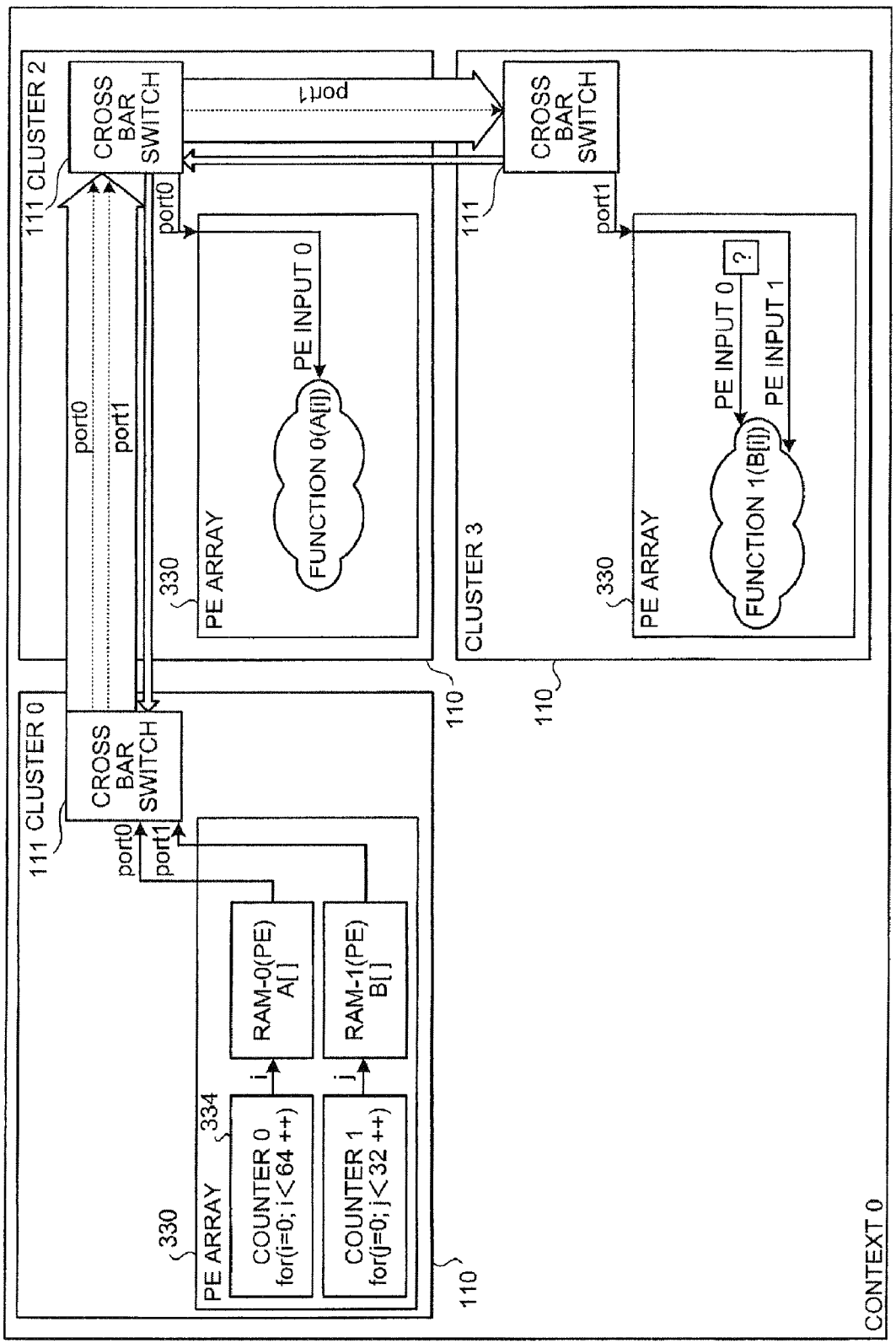
FIG. 14 is a schematic of an application installation example of the reconfigurable circuit in context 0.

The physically arranged wiring of the reconfigurable circuit 100 is described in an example of an operation that is performed when the application program above is installed. FIG. 14 is a schematic of an application installation example of the reconfigurable circuit in the context 0, and FIG. 15 is a schematic of an application installation example of the reconfigurable circuit in the context 1.

Figure 15:
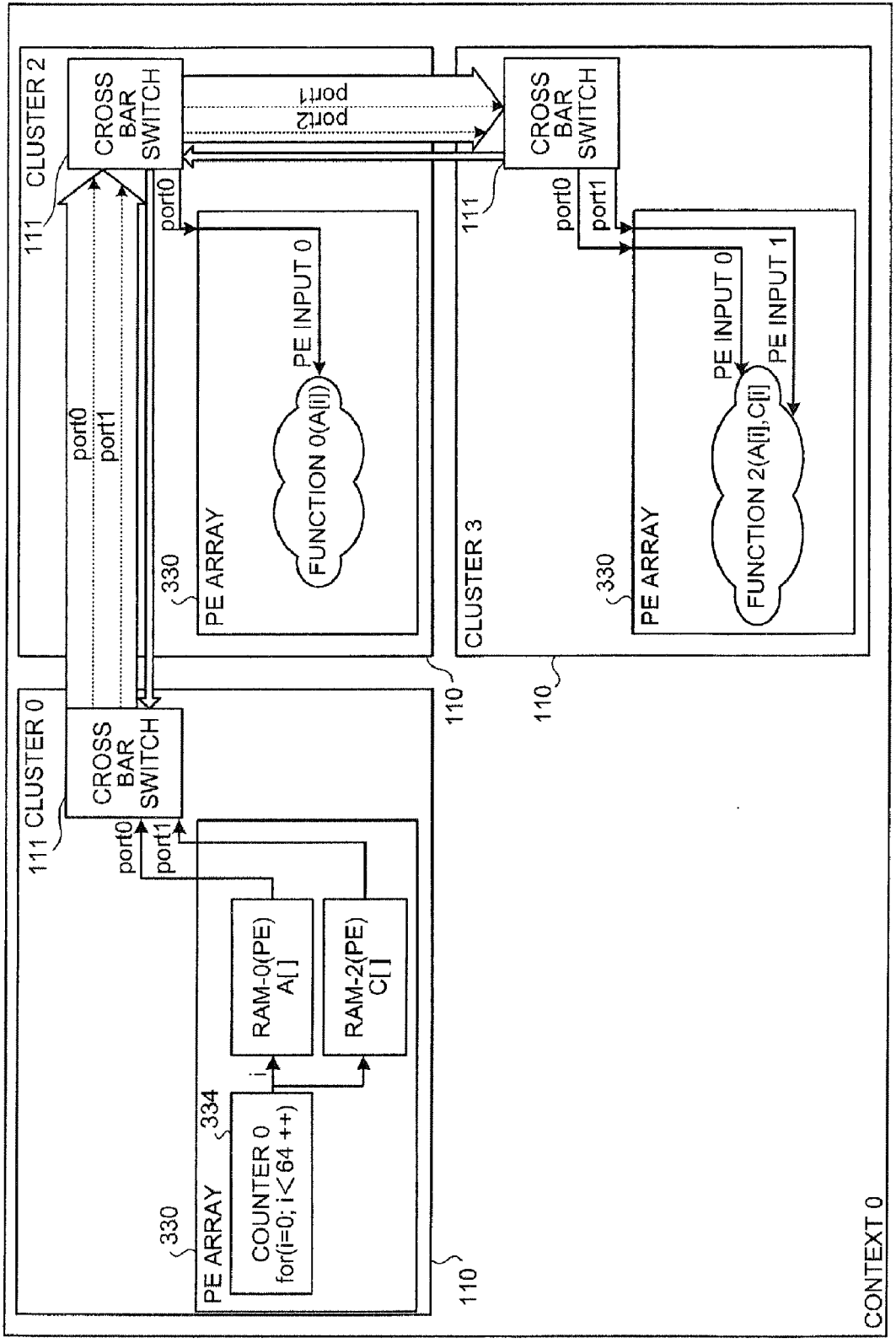
FIG. 15 is a schematic of an application installation example of the reconfigurable circuit in context 1.

As depicted in the application installation examples of FIGS. 14 and 15, three clusters 110 (the cluster 0, the cluster 2, and the cluster 3) are used when the application program written by the source code 1300 is executed. The three clusters 110 each change a context at the same timing. The array parameters A[ ], B[ ], and C[ ] are all expanded in the RAM in the cluster 0, and a counter in the cluster 0 reads out a parameter. An array parameter read out by the counter is transferred to the cluster 2 and to the cluster 3 via the crossbar switch 111. At this time, in the course of transfer between clusters 110, an output signal (output data) other than an inhibit signal passes through one stage of a DFF (see FIG. 1).

Figure 16:
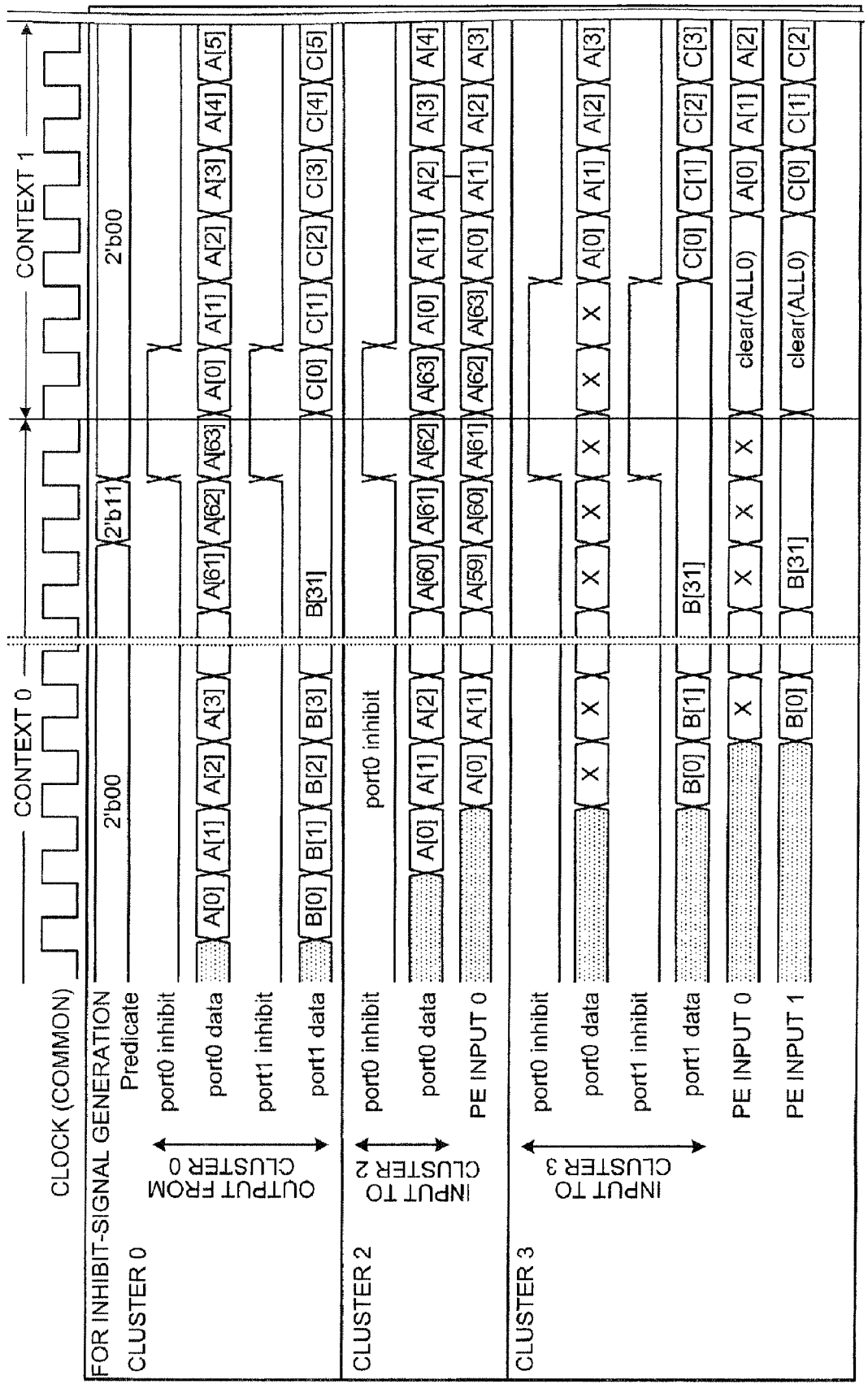
FIG. 16 is a timing chart of the operation of the application program depicted FIG. 13.
Figure 17:
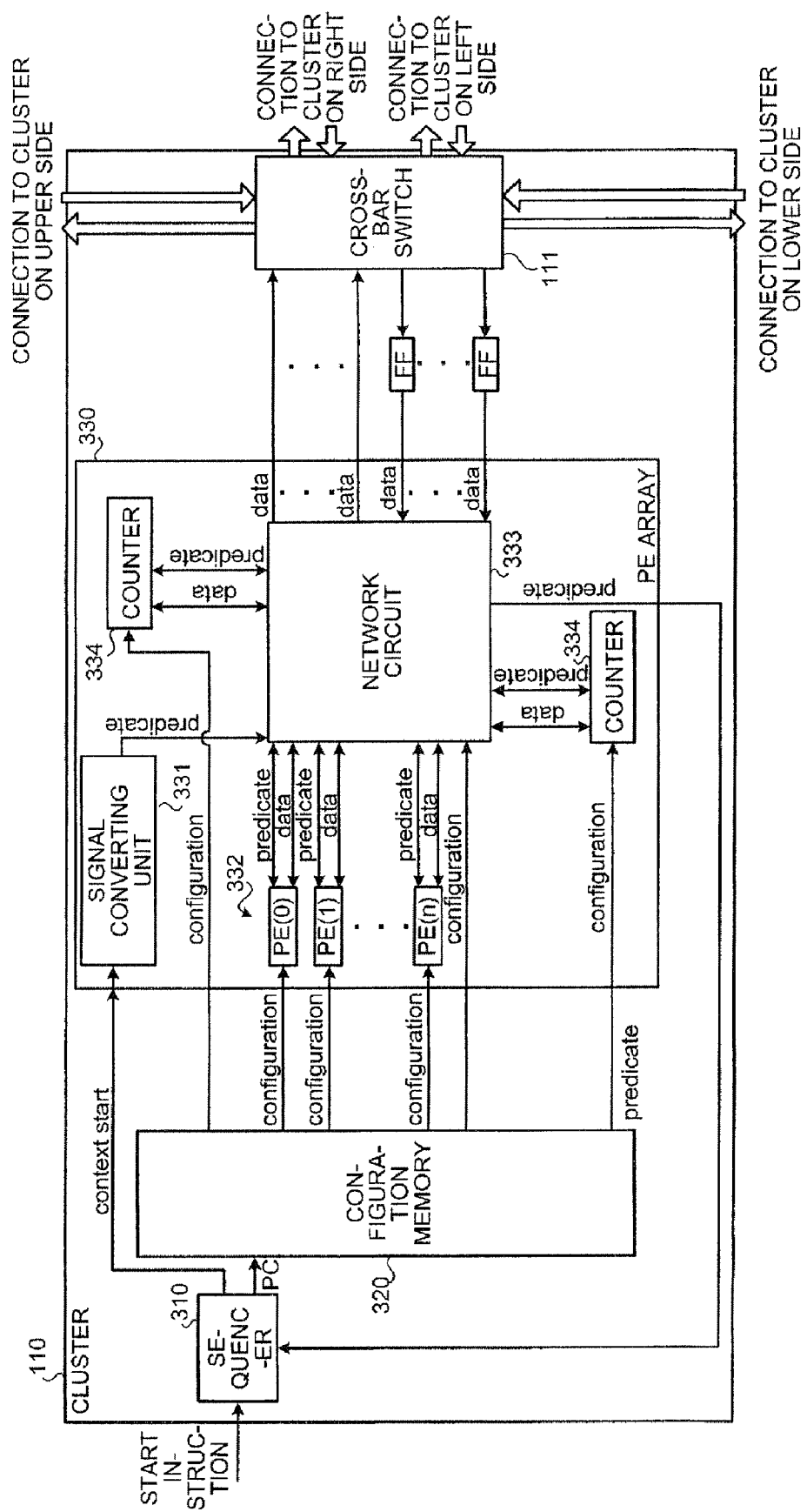
FIG. 17 is a circuit diagram of an internal configuration of a conventional cluster.
Figure 18:
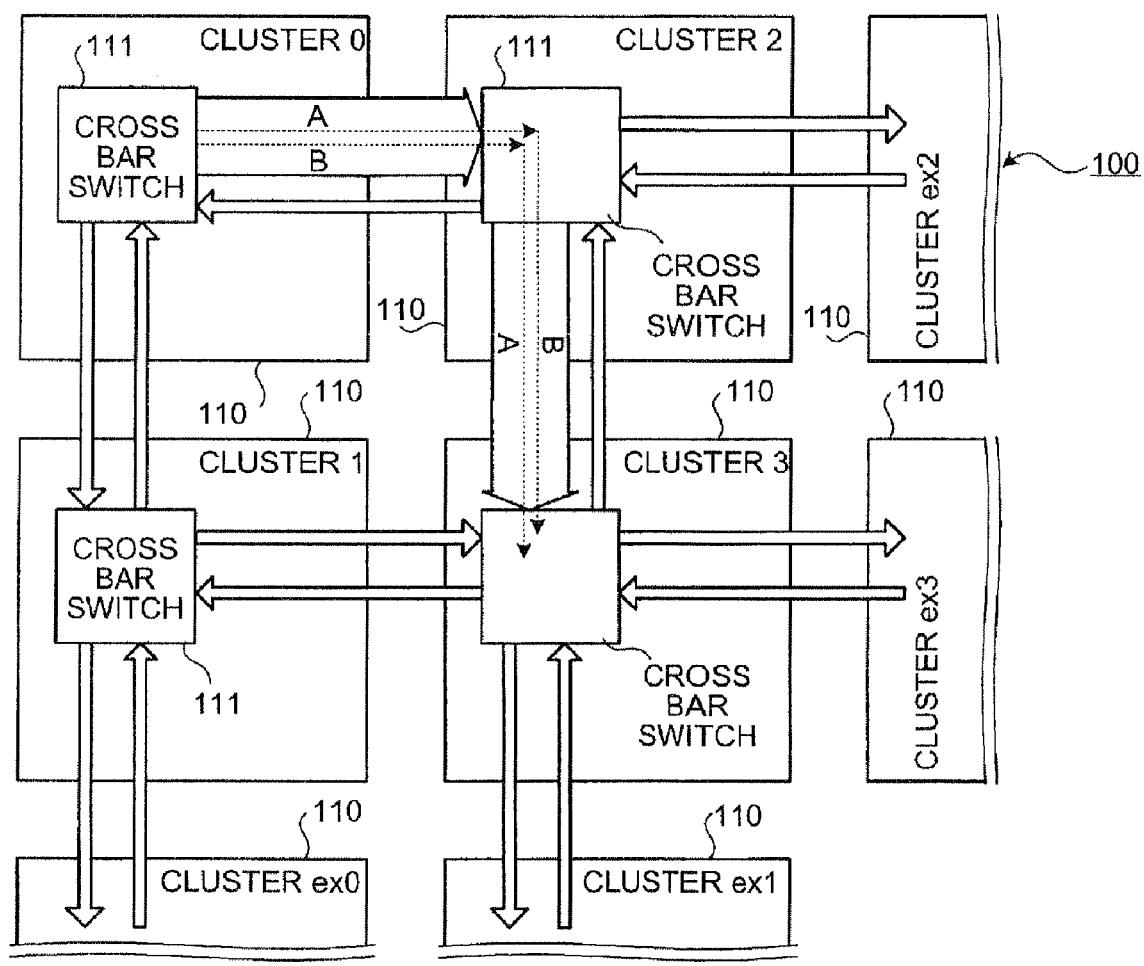
FIG. 18 is a schematic of an example of data transfer between conventional clusters.
Figure 19:
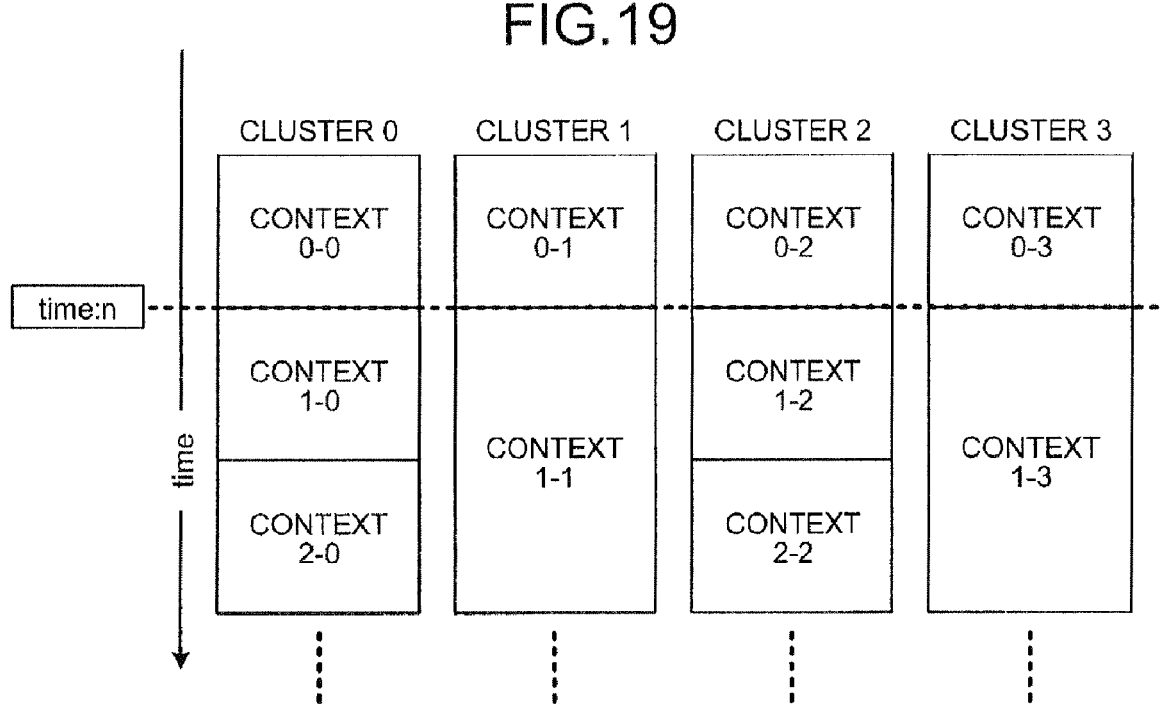
FIG. 19 is a schematic of a context switch sequence at each cluster.
Figure 20:
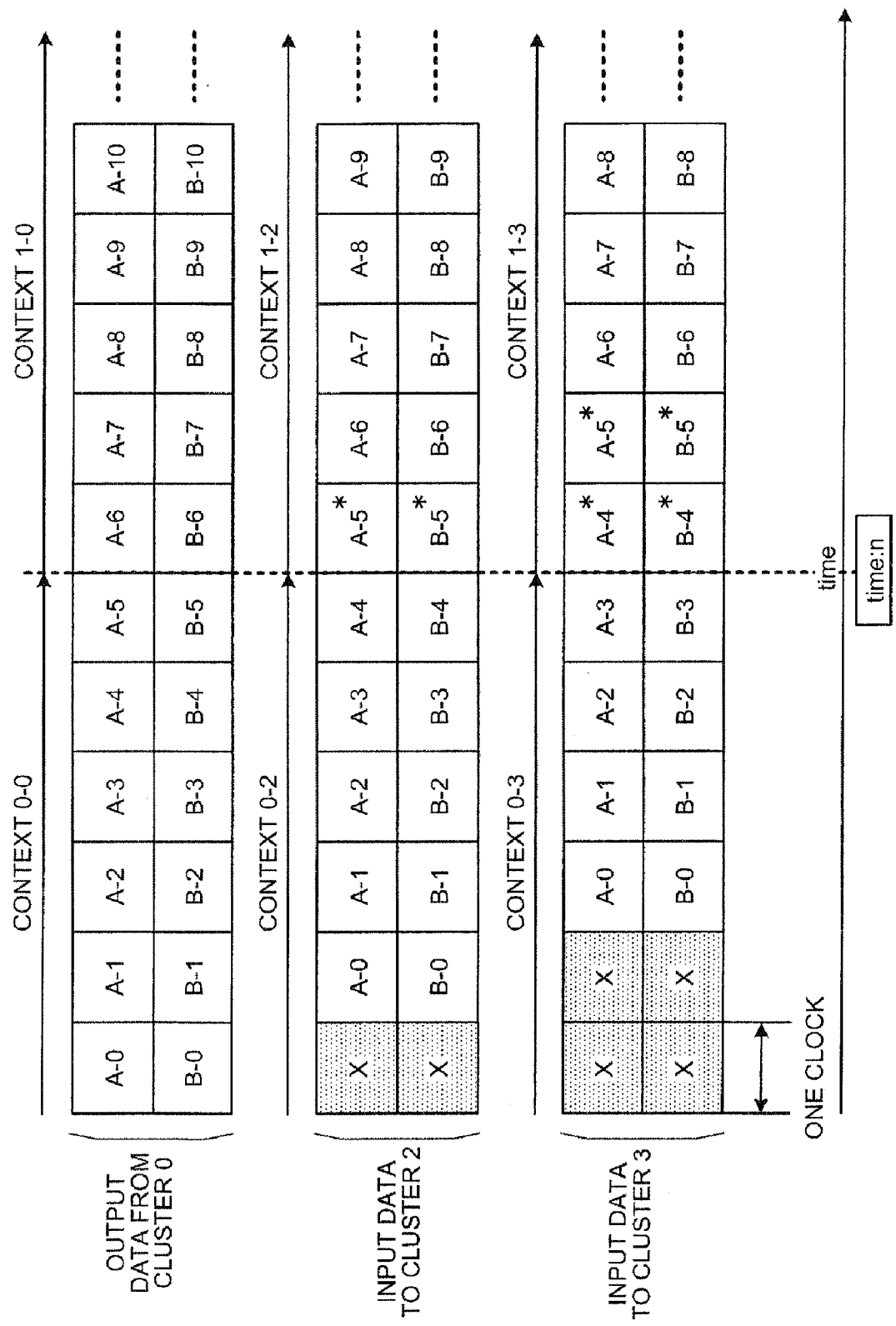
FIG. 20 is a timing chart of inter-cluster data transfer operation.

In context change from the context 0 to the context 1 in the configuration above, the following process is applied in each context to minimize waiting time (to zero). FIG. 16 is a timing chart of the operation of the application program depicted FIG. 13. Process contents in the contexts 0 and 1 are reflected in the timing chart of FIG. 16.

Immediately before the end of the context 0, an inhibit signal is generated in the cluster 0, and is added to the array parameters A[ ] and B[ ]. At this time, an inhibit signal generation period is set to "2", which is equivalent to clock cycles until the input of the inhibit signal to a PE in an adjacent cluster 110. In signal transfer from the cluster 0 to the cluster 3, to transfer the inhibit signal from the cluster 0 to a PE of the cluster 3 via the cluster 2 consumes 3 clock cycles. However, through the function of the crossbar switch 111 described with reference to FIGS. 10 and 11, an additional inhibit signal period is extended by one cycle. Therefore, the set inhibit generation period "2", is applied as it is.

In the context 1, setting is made in the cluster 2 for continuous use of input data of the context 0. Specifically, the input-data clearing circuit 360 in the cluster 2 makes setting so as not to clear input data from the port 0 and to which the inhibit signal is added. As a result, context switch can be executed without waiting time at the cluster 2 (see FIG. 16).

In the context 1, setting is made in the cluster 3 such that input data of the context 0 is not continuously used. Specifically, the input-data clearing circuit 360 in the cluster 3 makes setting so as to clear input data from the port 0 and the port 1 and to which the inhibit signal is added. As a result, the port 1 that has been used in the context 0 can be used as a port for transferring other data in the context 1. Although the port 0 is not used for input data in the context 0, the port 0 is reset at the start of the context 1 because the type of data to come is not known at that point. The resetting is achieved by the clearing operation based on the inhibit signal, thereby enabling operation to immediately proceed to a process in the next context without a soft resetting operation.

As described above, according to the reconfigurable circuit of the embodiment, waiting does not occur during context switch. Hence a decline in the performance of the reconfigurable circuit is prevented to realize optimum inter-cluster data transmission.

According to the embodiment, a report signal can be added to output data that is output during a process across context switch, thereby enabling a cluster to determine, based on the presence/absence of the report signal, whether received data is data output before context switch. Thus, the cluster can proceed to a process based on the next context without waiting for context switch.

Further, according to the embodiment, optimal inter-cluster data transmission corresponding to the contents of context switch is achieved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A dynamic reconfigurable circuit that includes a plurality of clusters each including at least one sequencer and a group of reconfigurable processing elements and that is capable of dynamically changing a configuration of the plurality of clusters according to a context including a description of processing of the processing elements and of connection between the processing elements, wherein a first cluster among the clusters comprises:
   a signal generating circuit that, when an instruction to change the context is received by the sequencer, generates a report signal indicative of the instruction to change the context;
   a signal adding circuit that adds the report signal generated by the signal generating circuit to output data that is to be transmitted from the first cluster to a second cluster after the instruction to change the context is received by the sequencer; and
   a data clearing circuit that, when output data to which a report signal generated by the second cluster is added is received, performs a clearing process of clearing the output data received.

2. The dynamic reconfigurable circuit according to claim 1, wherein the first cluster further comprises, upstream from the data clearing circuit, a switch circuit that controls reception of the output data transmitted from the second cluster, the switch circuit outputting the output data from the second cluster to the data clearing circuit when the output data from the second cluster is addressed to the first cluster, and transferring the output data from the second cluster to an adjacent third cluster when the output data from the second cluster is not addressed to the first cluster.

3. The dynamic reconfigurable circuit according to claim 1, wherein the signal generating circuit continuously generates the report signal during reception of the instruction to change the context.

4. The dynamic reconfigurable circuit according to claim 1, wherein the signal generating circuit continuously generates the report signal during a period corresponding to a setting of a context specified by the instruction to change the context.

5. The dynamic reconfigurable circuit according to claim 1, wherein the data clearing circuit invalidates the clearing process according to a setting of a context specified by the instruction to change the context.

6. The dynamic reconfigurable circuit according to claim 2, wherein
the first cluster further comprises a dedicated port from which the report signal is output,
the signal adding circuit, concurrently with output of the output data to be transmitted from the first cluster to the second cluster, outputs to the dedicated port, the report signal generated by the signal generating circuit, and
the data clearing circuit performs the clearing process when, together with the output data from the second cluster, the report signal transmitted from a dedicated port of and generated by the second cluster is received.

7. The dynamic reconfigurable circuit according to claim 6, wherein the data clearing circuit, when the output data transmitted from the second cluster is addressed to a fourth cluster and is received with a first report signal transmitted from the dedicated port of the second cluster, appends a second report signal of an arbitrary length to an end of the first report signal.

8. A data transmission control method of controlling data transmission between clusters in a dynamic reconfigurable circuit that includes a plurality of clusters each including at least one sequencer and a group of reconfigurable processing elements and that is capable of dynamically changing a configuration of the plurality of clusters according to a context including a description of processing of the processing elements and of connection between the processing elements, the data transmission control method comprising:
generating, when an instruction to change the context is received by the sequencer, a report signal indicative of the instruction to change the context;
adding to output data that is to be transmitted from the first cluster to a second cluster after the instruction to change the context is received by the sequencer, the report signal generated at the generating; and
clearing, when output data to which a report signal generated by the second cluster is added is received, the output data received.

* * * * *